Nov. 18, 1930. L. A. OSGOOD 1,782,125
WEIGHING SCALE
Filed Oct. 10, 1924 2 Sheets-Sheet 2
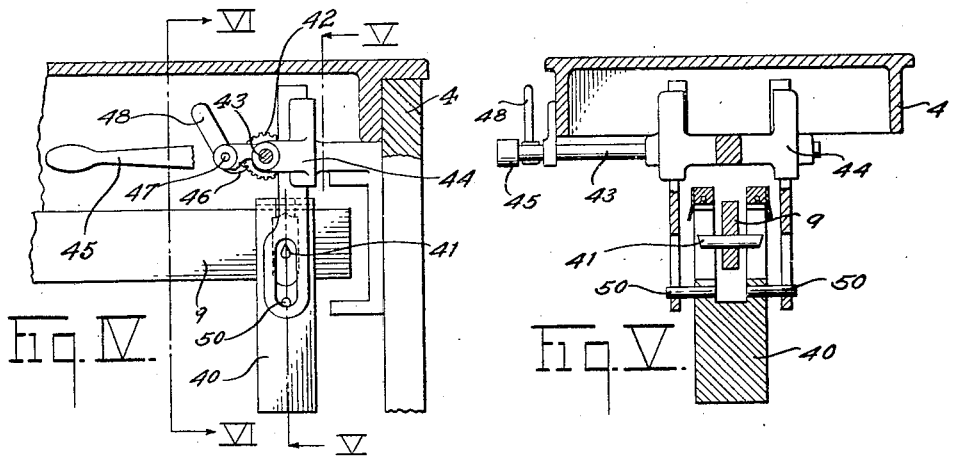
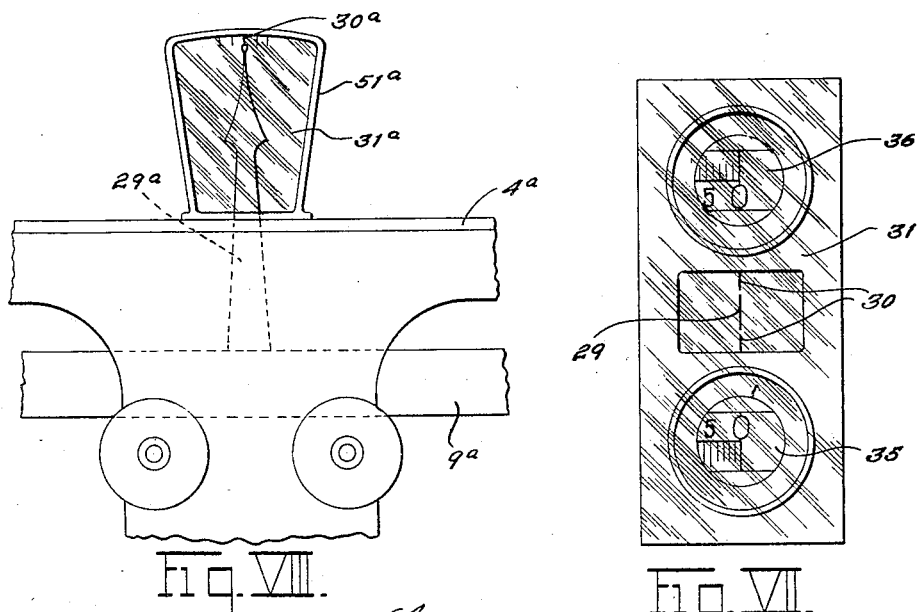
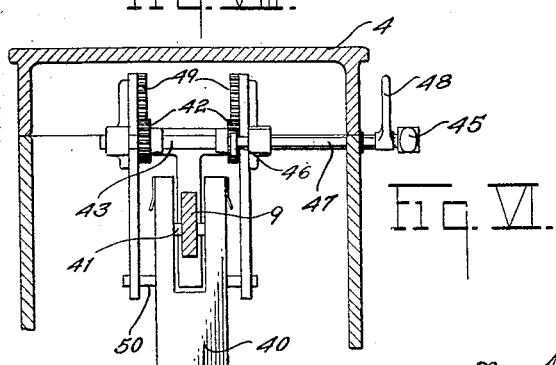
Inventor
Louis A. Osgood.
By C. D. Marshall
Attorney Patented Nov. 18, 1930

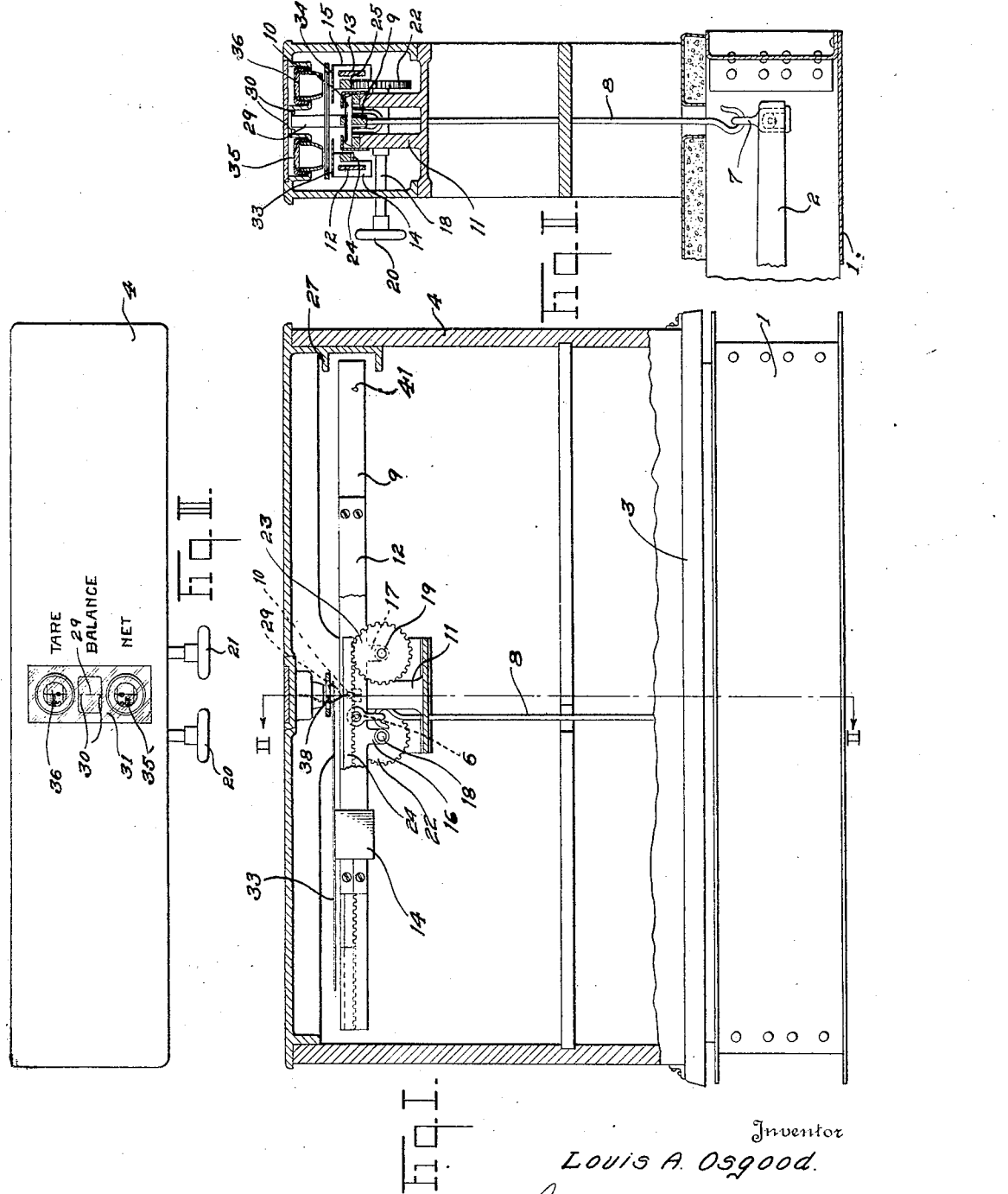

1,782,125

UNITED STATES PATENT OFFICE

LOUIS A. OSGOOD, OF HARTFORD, CONNECTICUT, ASSIGNOR TO TOLEDO SCALE COMPANY, OF TOLEDO, OHIO, A CORPORATION OF NEW JERSEY

WEIGHING SCALE

Application filed October 10, 1924. Serial No. 742,831.

This invention relates to weighing scales, and particularly to scales of the heavy capacity beam type having, in addition to extremely simple weighing mechanism, devices for counterbalancing trucks and other tare and for increasing the normal capacity of the scale.

One of the principal objects of this invention is the provision of a simple device which is adapted to indicate both tare and net weight or which may be used as an ordinary weighing device for indicating total weights.

Another object is the provision of a poise moving and tare indicating device which may be operated from the exterior of a housing enclosing the major portion of the operating mechanism.

Another object is the provision of a beam scale incorporating a novel poise operating device and having means for indicating the position of the poise on the beam.

Still another object is the provision of a scale in which the weight indications are magnified to afford easy reading.

Other objects and advantages will be apparent from the following description, in which reference is had to the accompanying drawings illustrating preferred embodiments of my invention and wherein similar reference numerals designate similar parts throughout the several views.

In the drawings:—

Figure I is an elevational view, partly in section, of a scale embodying my invention;

Figure II is a vertical sectional view through the scale taken on the line II—II of Figure I;

Figure III is a top plan view of the scale embodying my invention;

Figure IV is an enlarged fragmentary elevational view of a portion of a scale embodying a modified form of my invention;

Figure V is a sectional view taken substantially on the line V—V of Figure IV;

Figure VI is a sectional view taken substantially on the line VI—VI of Figure IV;

Figure VII is an enlarged plan view of the indicating means; and

Figure VIII is an elevational view of a modified form of indicating means.

The scale illustrated in Figures I, II and III comprises a base 1, preferably fabricated of metal plates for purposes of strength and rigidity, which houses and supports lever mechanism 2 (the major portion of which is not shown), the lever mechanism in turn supporting the load-receiving platform 3.

Erected upon one end of the base 1 is a substantially rectangular cabinet 4 which supports and encloses the load-counterbalancing mechanism. The lever mechanism in the base 1 is connected, as at 6, by means of a stirrup 7 and steelyard rod 8 to a beam lever 9, the lever 9 being provided with a pivot 10 and suitably fulcrumed in bearings supported in a bracket 11 forming a portion of the cabinet 4. The lever 9 is also provided with a pair of beams 12 and 13 and slidably mounted on the beams are poises 14 and 15. Depending from the lever 9 are bosses 16 and 17 which are bored to receive a pair of shafts 18 and 19 that project through enlarged openings in the walls of the cabinet 4, the projecting portions being provided with hand wheels 20 and 21. Fixed to the shafts 18 and 19 are gears 22 and 23, the teeth of which mesh with toothed racks 24 and 25 fixed to the poises 14 and 15. It will be obvious that a load placed upon the platform of the scale will exert a downward pull on the rod 8, causing the lever 9 and associated mechanism to oscillate in a counterclockwise direction until one end of the lever comes into contact with a stop 27 forming a part of the cabinet 4. In order to obtain an indication of the weight of the load on the platform it is only necessary to rotate one of the hand wheels, thus moving one of the poises to a position balancing the load to be weighed. In order to determine when the load is balanced I have provided the lever 10 with an upwardly projecting vane 29 (see Figures II, III and VII) which, when the scale has reached a condition of balance, will be in alignment with a pair of stationary vanes 30 fixed to the cabinet structure. The position of the vane 29 is rendered visible through a glazed opening 31 in the cabinet.

In order to determine the weight of an article the poises 14 and 15 have been provided with thin metal bars or strips 33 and 34 which are suitably graduated and so arranged that when the poises are manipulated the graduations are moved under magnifying reading lenses 35 and 36. For most weighings only one poise need be used to counterbalance the platform load and when the poise has been moved to a position just balancing the load on the platform (the condition of balance being indicated by the alignment of the vanes 29 and 30), the graduation in registration with an index or reading wire 38 as viewed through the magnifying lens indicates the weight of the article. With the aid of the magnifying lens the weight of the article may be determined with great ease and accuracy.

The rack and pinion mechanism for operating the poises is shown by way of example only, and it is to be understood that any suitable poise operating mechanism may be substituted for that illustrated.

If it is desired to determine the tare and net weight it is only necessary to set the poise 15 in position to balance the tare and move the poise 14 until the load is balanced. The net weight will then be indicated by the graduations on the ribbon attached to the poise 14, which are visible through the magnifying lens 35.

In order to make it possible to weigh objects whose weight exceeds the capacity of the poise load-counterbalancing mechanism, I have provided the means shown in Figures IV, V and VI. This additional counterbalancing means comprises a unit weight 40 adapted to be deposited upon a pivot 41 fixed in one end of the lever 9. The means for manipulating the unit weight 40 includes a pair of pinions 42 fixed on a shaft 43 supported in bearings forming a part of a bracket 44 which may be secured to the cabinet 4 by any adequate means. The pinions normally mesh with vertically disposed toothed racks 49, the lower portions of which are provided with slots that receive pins 50. The pins 50 support the unit weight 40 when it is removed from the lever 9. The shaft 43 is provided with a suitable operating handle 45 for manipulating the unit weight, and a pawl 46 fixed to an auxiliary stud shaft 47 normally engages one of the pinions 42 to restrict the movement of the unit weight. A small handle 48 affords a convenient means for releasing the said pawl when desired.

As shown in Figures IV and V, the lever 9 is free to oscillate without the unit weight which is suspended upon the pins 50, but by releasing the pawl 46 and moving the handle 45 the unit weight 40 may be deposited upon the lever 9 and in this manner a unit increase in the capacity of the scale is effected.

In the modified form of indicating device illustrated in Figure VIII, the beam $9^a$ carries an upright pointer $29^a$ which co-operates with a series of graduations $30^a$ visible through an upright window $31^a$ mounted in a suitable frame $51^a$ secured to the top of the cabinet $4^a$. Owing to the length of the pointer $29^a$ the position of the beam is indicated with great accuracy.

The embodiments of my invention herein shown and described are to be regarded as illustrative only, and it is to be understood that the invention is susceptible to variation, modification and change within the spirit and scope of the subjoined claims.

Having described my invention, I claim:

1. In a device of the class described, in combination, a beam, a poise slidably mounted thereon, a graduated member fixed to and movable with said poise, and magnifying means for rendering a portion of said graduated member visible.

2. In a device of the class described, in combination, a casing, a beam housed therein, a poise bearing graduations slidably mounted on said beam, a poise operating device having a handle located exteriorly of said casing, means for indicating the position of said poise on said beam, and a magnifying reading lens cooperating with said indicating means.

3. In a device of the class described, in combination, a casing, a beam housed therein, a poise bearing graduations slidably mounted on said beam, a poise operating device comprising a rack and pinion mechanism and having a handle located exteriorly of said casing, means for indicating the position of said poise on said beam, and a magnifying reading lens cooperating with said indicating means.

4. In a weighing scale, in combination, a casing, a beam housed therein, a poise bearing a series of graduations mounted on said beam, said means for operating said poise having a handle located exteriorly of said casing, means for indicating the position of the poise, and means for increasing the capacity of the scale, said capacity increasing means having an operating handle located exteriorly of said housing.

5. In a weighing scale, in combination, a casing, weighing mechanism including a lever housed therein, a unit weight and means operable from outside said casing for depositing said unit weight on said lever, a beam carried by the lever, a poise bearing a series of graduations slidably mounted on said lever, a poise operating device including rack and pinion mechanism, and means for manipulating said poise operating device from outside said casing.

LOUIS A. OSGOOD.